Patented Nov. 15, 1932

1,887,820

UNITED STATES PATENT OFFICE

ANTON OSSENBECK, OF COLOGNE-MULHEIM-ON-THE-RHINE, WINFRID HENTRICH, OF WIESDORF-ON-THE-RHINE, AND ERNST TIETZE, OF COLOGNE-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

SULPHONATED ISATOIC ACID ANHYDRIDE AND PROCESS OF MAKING SAME

No Drawing. Application filed June 11, 1929, Serial No. 370,154, and in Germany June 19, 1928.

The present invention relates to a process of sulphonating isatoic acid anhydrides, and to new products obtainable thereby.

The manufacture of aromatic sulphonated o-amino-carboxylic acids by direct sulphonation of the carboxylic acids by means of sulphuric acid has not been described hitherto. The same applies to sulphonic acid derivatives from isatoic acid, which are unknown. The reason for this is probably the ready cleavage of isatoic acids by acids (c. f. Beilstein, vol. 2, III, page 1251). Sulphonated anthranilic acids are only obtained in a round-about manner, for example, the 4-sulpho-2-aminobenzoic acid from nitrotoluene sulphonic acid (German Patent No. 138,188 and Rec. trav. chim. Pays Bas 24, 194–208) or by the sulphonation of anthranilic acid by means of sulphuric acid chlorhydrine in indifferent organic or inorganic solvents (German Patents Nos. 296,941 and 307,284), whereby 5-sulpho-2-aminobenzoic acid is produced.

In accordance with the present invention the hitherto unknown sulphonic acids of isatoic acid anhydrides, and consequently the corresponding sulpho-amino-carboxylic acids are obtainable in a simple and very smooth manner by treating isatoic acid anhydrides, such as isatoic acid anhydride, naphthisatoic acid anhydride, bis-isatoic acid anhydride

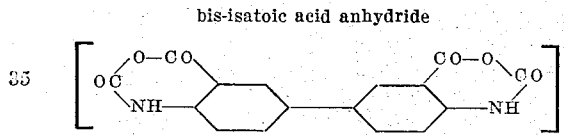

and the like, the nuclei of which compounds may be further substituted by monovalent substituents such as alkyl-, aryl-, aralkyl-, $NO_2$-, COOH- groups, halogen atoms and so on with fuming sulphuric acid. The concentration of the sulphuric acid and the temperature can be varied within wide limits, fuming sulphuric acids of about 1–40% $SO_3$ content and temperatures between about 0–20° C. being mentioned by way of example.

The products thus obtainable form colorless to yellow crystals soluble in water, from which solutions they can easily be salted out by the addition of f. i. sodium chloride, potassium chloride or the like. When treated with hot sodium carbonate solution they are split up to the corresponding sulpho-amino carboxylic acids.

The invention is illustrated by the following examples, without being restricted thereto.

Example 1.—100 parts by weight of isatoic acid anhydride are introduced into 500 parts by weight of 20% oleum at a temperature between about 0–10° C., when the isatoic acid anhydride dissolves. The mixture is allowed to stand at ordinary temperature until a test portion is completely soluble in water. The reaction mixture is then poured on to ice, and the sulphonated isatoic acid anhydride is salted out with common salt. For the manufacture of the sulphonated anthranilic acid corresponding to this sulphonated isatoic acid anhydride, the latter is treated with hot aqueous sodium carbonate solution, whereby solution occurs with splitting of the hetero-cyclic ring system. The resulting sulphonated anthranilic acid can be precipitated with hydrochloric acid. It is identical with the 5-sulpho-2-aminobenzoic acid.

In an analogous manner the methylisatoic acid anhydride of the formula:

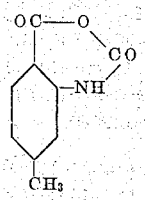

which is obtainable by the action of phosgene on 4-methyl-2-aminobenzoic acid yields a sulphonated methylisatoic acid anhydride, which by the splitting of the ring gives 5-sulpho-4-methyl-2-aminobenzoic acid.

Example 2.—100 parts by weight of the naphthisatoic acid anhydride, being obtainable by reacting with phosgene upon 2-naphthylamine-3-carboxylic acid, are introduced at a temperature of about 10° C. into 500 parts by weight of fuming sulphuric acid of 20% $SO_3$ content. The mixture is allowed to stand at ordinary temperature until a sample is completely soluble in water. The reaction mixture is then poured on to ice and the sodium salt of the sulpho-naphthisatoic acid anhydride is precipitated by salting out with sodium chloride. The compound thus obtainable can be transformed into the corresponding sulphonated naphthylamine-carboxylic acid as described in Example 1.

When starting instead of with naphthisatoic acid anhydride with bisisatoic acid anhydride (obtainable by reacting with phosgene upon benzidine-o.o'-dicarboxylic acid), a sulphonated product of similar properties will be obtained.

We claim:—

1. Process which comprises reacting upon an isatoic acid anhydride with fuming sulphuric acid.

2. Process which comprises reacting upon an isatoic acid anhydride with fuming sulphuric acid between about 1-40% strength and at a temperature between about 0-20° C.

3. Process which comprises reacting upon a compound of the group consisting of naphthisatoic acid anhydride, isatoic acid anhydride and its alkyl substitution products with fuming sulphuric acid.

4. Process which comprises reacting upon a compound of the group consisting of naphthisatoic acid anhydride, isatoic acid anhydride and its alkyl substitution products with fuming sulphuric acid between about 1-40% strength and at a temperature between about 0-20° C.

5. As new products sulphonated isatoic acid anhydrides being obtainable in accordance with the process claimed in claim 1, said products forming colorless to yellow crystals soluble in water, being split off by hot aqueous sodium carbonate solution to the corresponding sulpho-o-amino-carboxylic acids.

6. As new products sulphonated isatoic acid anhydrides being obtainable in accordance with the process claimed in claim 4, said products forming colorless to yellow crystals soluble in water, being split off by hot aqueous sodium carbonate solution to the corresponding sulpho-o-amino-carboxylic acids.

In testimony whereof we have hereunto set our hands.

ANTON OSSENBECK. [L. S.]
WINFRID HENTRICH. [L. S.]
ERNST TIETZE. [L. S.]